(No Model.) 2 Sheets—Sheet 1.
E. T. HOLTON.
CATTLE PEN.
No. 337,681. Patented Mar. 9, 1886.
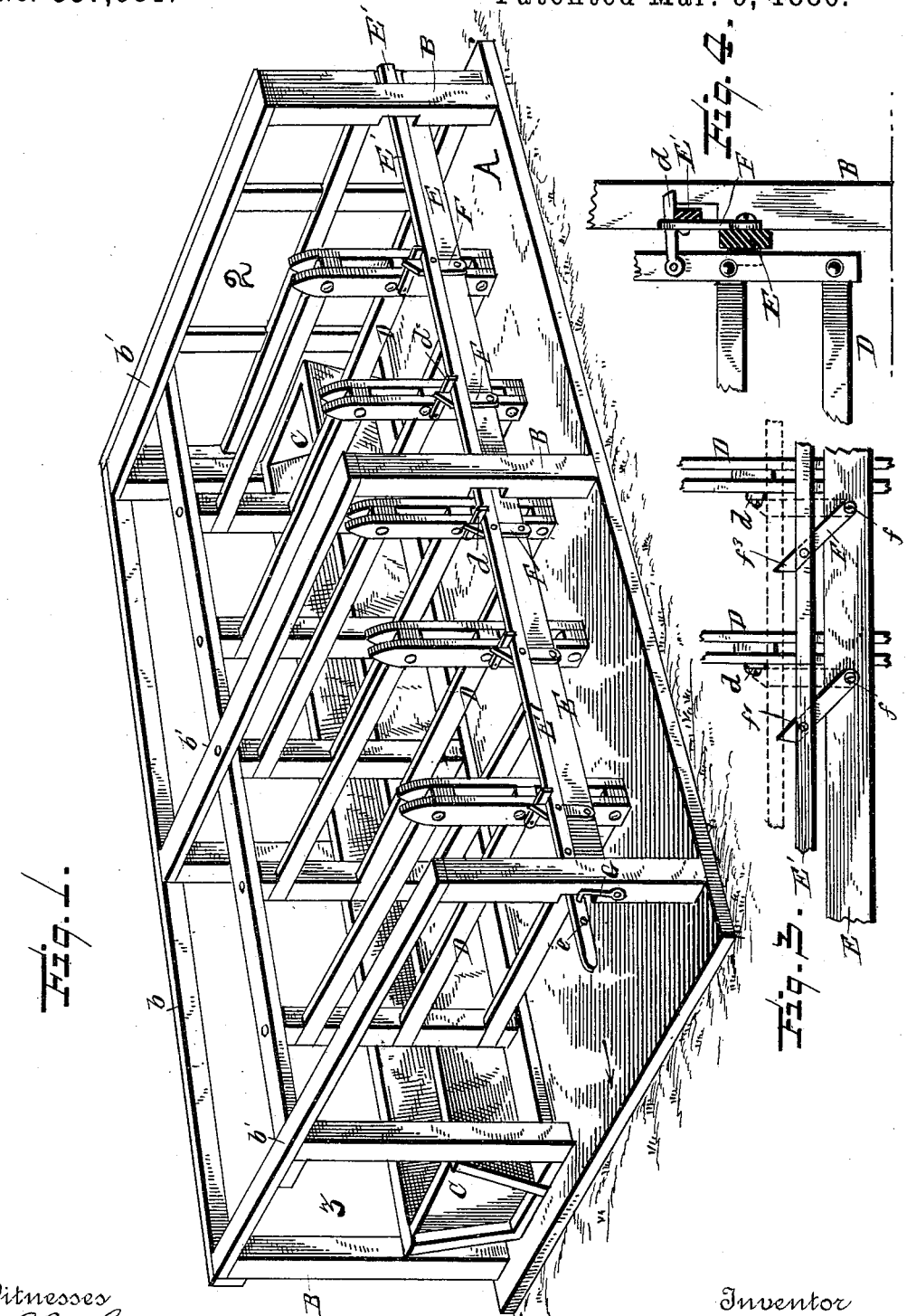
Witnesses
Inventor
Edward T. Holton

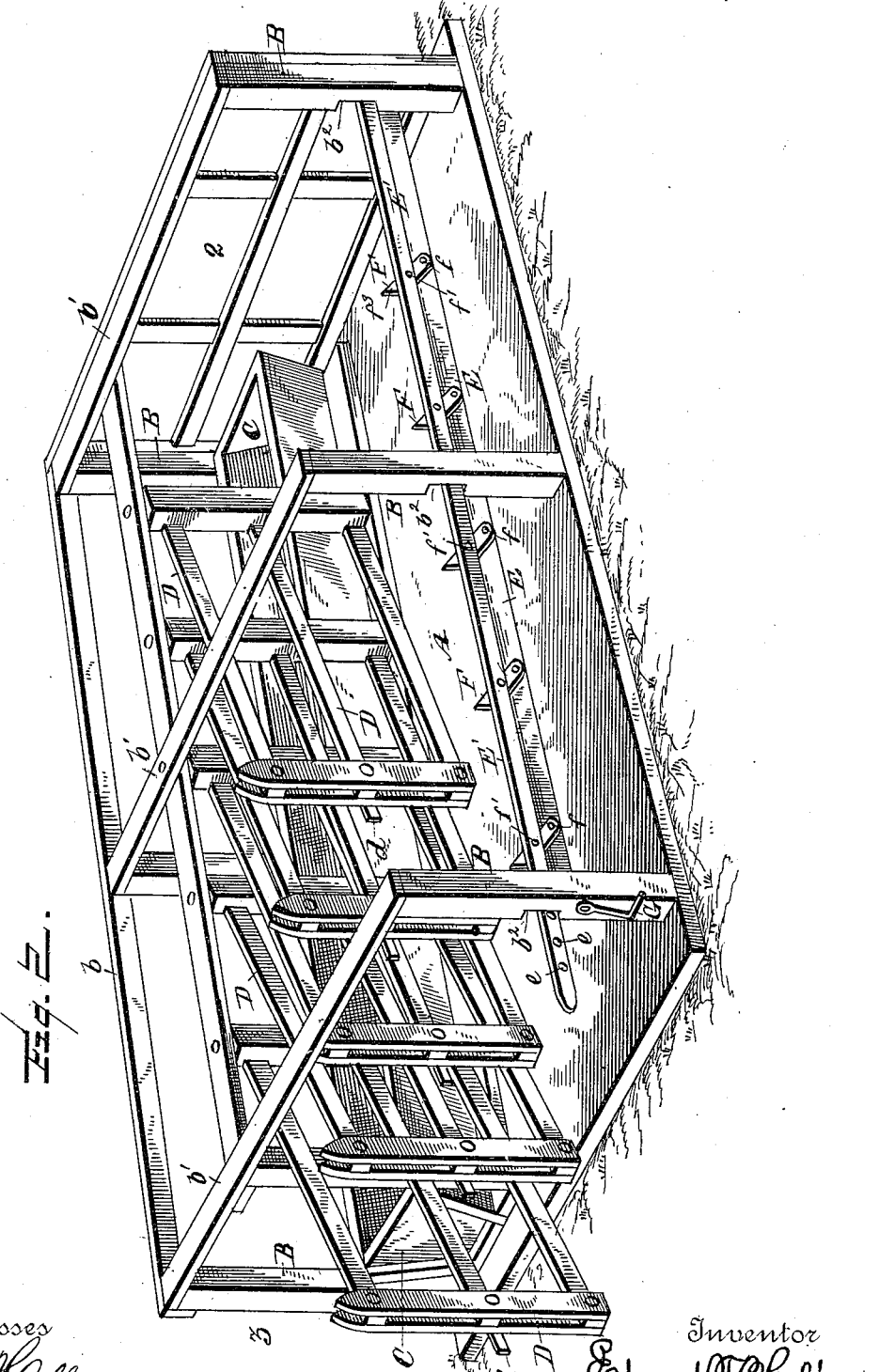

United States Patent Office.

EDWARD T. HOLTON, OF THE PLAINS, VIRGINIA.

CATTLE-PEN.

SPECIFICATION forming part of Letters Patent No. 337,681, dated March 9, 1886.

Application filed December 11, 1885. Serial No. 185,366. (No model.)

*To all whom it may concern:*

Be it known that I, EDWARD T. HOLTON, a citizen of the United States, residing at The Plains, in the county of Fauquier and State of Virginia, have invented a new and useful Improvement in Cattle-Pens, of which the following is a specification.

My invention relates to cattle-pens, and has for its object the provision of means for confining animals in separate stalls, and then releasing them by the withdrawal of locking devices by the single movement of a horizontally-movable bar.

To the accomplishment of my object my invention contemplates a cattle pen or stable divided into separate stalls by swinging gates, said gates being provided at their free ends with suitable latches that take onto locking devices attached to a common bar, which bar by being moved will release all the gates at one time, all as hereinafter fully described, and specifically pointed out in the claims.

Referring to the accompanying drawings, in which like letters of reference point out similar parts on each figure, Figure 1 is a perspective view of a cattle-pen embodying my invention, showing gates closed to form stalls. Fig. 2 is a like perspective view showing the gates swung open, to allow egress of the animals. Figs. 3 and 4 are detail views.

In the drawings, A represents the floor of a stable; B, uprights; $b$ $b'$, cross-ties; $b^2$, notches in the rear uprights; C, feed-trough; D, pivoted or hinged gates, each provided at its free end with a latch or locking device, $d$.

E is a stationary horizontal bar extending across the rear of the frame and secured to uprights B.

E' is a horizontally-movable bar or rod arranged above the stationary bar E.

F represents short strips, pivoted at $f$ to the bar E, and at $f'$ to the bar E', said strips having an upwardly-extending free point obliquely cut off at one side, forming detents $f^3$, for a purpose hereinafter set forth.

G is a hook that takes into orifices $e$ of the bar E'.

One end of the pen (see indicating-numeral 2) is intended to be permanently closed, while the opposite end, 3, is open for entrance and exit of the animals.

In practice the end 3 is supplied with a closing door (not shown in the drawings) for an obvious purpose.

From inspection of the drawings the nature and object and the operation of my invention will be readily understood. When the stable is empty, the several gates are swung open in the position shown in Fig. 2, the retaining-hook G is released from engagement with bar E', and said bar will fall down in position shown in said figure, whereby the several pivoted strips F will be inclined obliquely toward the end 3. When it is intended to drive animals into the pen, said bar is pushed lengthwise until it assumes the position shown in Fig. 1, (see also dotted lines, Fig. 3,) and is then securely locked by a hook, G, a bolt, or any suitable device. The animals are then driven in one by one through the open end 3, and as soon as one animal reaches the end 2 the first gate is turned until it is at right angles to the trough C, making a complete locked stall, and so on successively, as each animal enters, is another gate turned into a similar position until all assume the position shown in Fig. 1. It will be understood that as the gates are swung into such position the latch $d$ thereof will pass upward over the oblique side of a detent, $f^3$, pass over its upward point, and then fall down over the opposite side, and thus the respective gates will be securely locked by the intermeshing latches and detents, and the gates cannot then be moved out of position shown in Fig. 1 until the several latches are released from engagement with their respective detents.

In order to permit the several gates to swing open, to allow the outward passage of the animals in direction of the arrow, Fig. 1, the hook G or fastening device is unshipped, and the bar E' is moved in a horizontal direction outwardly toward the open end 3 in direction of the arrow, and every gate will thus be free to open.

The gist of my invention being the means shown and described for simultaneously releasing all the gates by a single operation, in contradistinction to the practice in similar contrivances, wherein the attendant has to separately unlock each gate. I thus provide a simple, easy, and inexpensive device for securing cattle in a series of movable stalls, and for releasing them all by a single movement.

For the purpose of plainly illustrating my invention and its manner of operation, I have shown and described a form of pivoted detents and interlocking latches, also a hook, G, for holding the bar E' in position, but do not wish to be understood as confining myself to such special construction, for it is manifest that such locking and holding devices may be changed in form and structure without departing from the scope of my invention.

Having now fully described my invention, what I claim, and desire to secure by Letters Patent, is—

1. A pen for cattle, consisting of a series of stalls divided by swinging partitions, said partitions provided at their free ends with latches, in combination with a stationary bar, E, and a horizontally-movable bar, E', having pivoted strips F, as and for the purpose intended, substantially as described.

2. A cattle-pen divided into stalls by swinging partitions D, each partition supplied with a locking device, $d$, in combination with a series of strips, F, pivoted to the stationary bar E, and a horizontally-movable bar, E', said strips being adapted to engage with said locking devices when the bar E' is moved in one direction, and released by its movement in a contrary direction, as and for the purpose intended, substantially as described.

3. In a cattle-pen-partition locking and releasing device, the stationary bar E, attached to uprights B, having notches $b^2$, in combination with the horizontally-movable bar E', provided with orifices $e$, and a locking device, said bar being connected by a series of pivoted strips, F, said strips having upwardly-extending detents $f^3$, as and for the purpose intended, substantially as described.

EDW. T. HOLTON.

Witnesses:
 JACOB K. KENGLA,
 A. S. TAYLOR.